United States Patent

Gasper

[15] 3,638,018

[45] Jan. 25, 1972

[54] MEANS OF MEASURING TEMPERATURE AND NEUTRON FLUX

[72] Inventor: Kenneth A. Gasper, Richland, Wash.

[73] Assignee: McDonnell Douglas Corporation

[22] Filed: July 14, 1969

[21] Appl. No.: 841,423

[52] U.S. Cl. .............................. 250/83.1, 73/360, 176/19 R, 250/83.3 R
[51] Int. Cl. ............................................................ G01t 3/04
[58] Field of Search .............. 250/83.1, 83.8 R; 73/340, 360; 176/19

[56] References Cited

UNITED STATES PATENTS 3,077,775   2/1963   Hoffman .................................. 73/341
3,444,373   5/1969   Obrowski et al. ...................... 250/83.1

Primary Examiner—James W. Lawrence
Assistant Examiner—Morton J. Frome
Attorney—Walter J. Jason, Donald L. Royer and D. N. Jeu

[57] ABSTRACT

Temperature-sensing device including an emitter capsule containing a radioisotope fuel, a collector housing enclosing the emitter capsule, emitter capsule support means which produces a dominant thermal conduction loss in the heat balance of the device and which maintains the external emitter surface at a predetermined spacing from the internal collector surface, a cesium vapor source communicating with the interelectrode space, and emitter and collector connections providing an electrical output from the device. In this device, collector temperature is directly coupled to emitter temperature and allows determination of ambient (collector) temperature from emitter temperature which can be accurately derived from the device's output curve. Neutron-flux-sensing device is obtained by fueling the device with a material which undergoes an exothermic reaction under neutron bombardment. Heat produced is directly proportional to neutron flux present and is directly proportional to emitter temperature in a thermal conduction dominated device, for a given collector temperature. Thus, the neutron flux can be determined from the emitter temperature which can be derived from the device's output curve. Alternately, in this device or a device where the thermal conduction loss is not dominant, the neutron flux can be determined from the maximum power point of the output curve.

15 Claims, 9 Drawing Figures

PATENTED JAN 25 1972
3,638,018
SHEET 1 OF 2
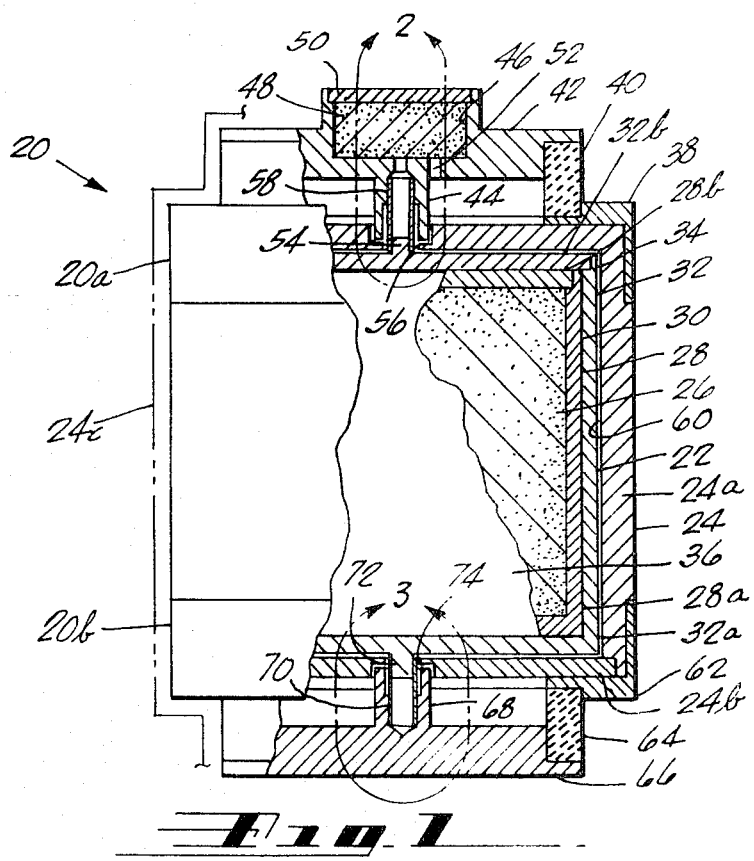
Fig 1
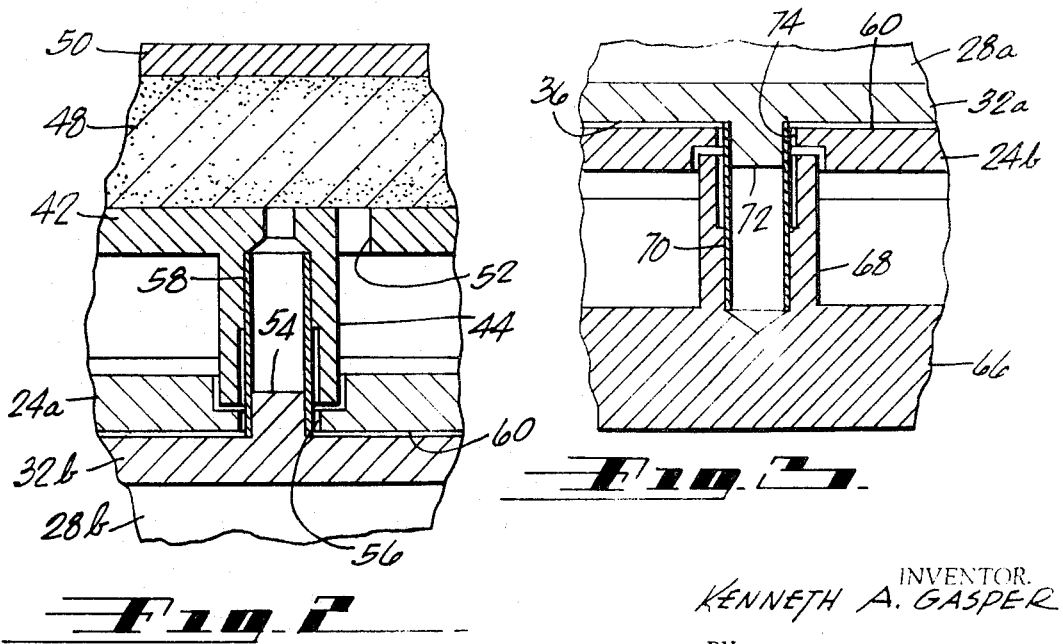
Fig 2
Fig 3
INVENTOR.
KENNETH A. GASPER
BY
-AGENT-

MEANS OF MEASURING TEMPERATURE AND NEUTRON FLUX

CROSS-REFERENCE TO RELATED APPLICATION

A radioisotope-fueled thermionic energy conversion device is shown, described and claimed in a copending patent application of Ned S. Rasor, John G. DeSteese and Kenneth A. Gasper, Ser. No. 794,933 filed on Jan. 29, 1969 for Thermionic Conversion Atomic Diode Battery.

BACKGROUND OF THE INVENTION

My present invention relates generally to sensing devices and more particularly to a sensor capable of use in the core of a nuclear reactor for sensing temperature therein with one version of the sensor or for sensing neutron flux therein with another version thereof.

Mercury thermometers, thermocouples (thermoelectric thermometers), and infrared and optical pyrometers are examples of conventional temperature-sensitive devices which can be used for measuring high temperatures. These conventional devices, however, cannot be readily or feasibly used for monitoring the high temperatures within the core of a nuclear reactor. For this application, a radiation resistant device capable of reliable remote operation, and capable of producing accurate and easily detected signals is needed.

Similarly, reactor neutron fluxes are presently sensed (measured) by ionization chambers connected to proportional counters and containing boron-10 ($B^{10}$), helium-3 ($He^3$), fissionable material, or hydrogeneous material. This type of neutron-sensing device provides flux measurement during operation, but requires high-voltage connections and often large accommodation spaces. Induced activity sensors (activation detectors) are another commonly used type of neutron-sensing device. Operation of this latter type of device, however, involves at least the two steps wherein irradiation is subsequently followed by activity measurements. Thus, a somewhat awkward procedure must be followed to measure neutron flux with the induced activity sensors.

SUMMARY OF THE INVENTION

Briefly, and in general terms, my invention is preferably accomplished by providing a radioisotopic diode device including an emitter capsule containing a radioisotope fuel and having an external emitter surface, a collector housing enclosing the emitter capsule and having an internal collector surface, means for supporting the emitter capsule in the collector housing and maintaining the emitter surface at a predetermined spacing from the collector surface, an additive source communicating with the spacing between the emitter and collector surfaces to provide an additive vapor used as a surface adsorbate to modify properties of the emitter and collector surfaces, and emitter and collector connections providing an electrical output from the device.

A temperature-sensing device is preferably obtained by using emitter capsule support means which produces a dominant thermal conduction loss term in the heat balance of the diode device such that collector temperature is directly coupled to emitter temperature. This allows the determination of ambient (collector) temperature from the emitter temperature which can be accurately derived from the current versus voltage output curve of the temperature sensing device.

A neutron flux-sensing device is obtained by modifying the temperature-sensing device whereby it is fueled with a material which undergoes an exothermic reaction under neutron bombardment. Thus, the heat generated is supplied by neutron-induced reactions instead of radioisotope decay. Since the heat produced is directly proportional to the neutron flux present, and this heat (thermal power density) is directly proportional to emitter temperature in a thermal conduction dominated device, for a given collector temperature, the neutron flux can be measured by determining the emitter temperature from the output curve of the neutron flux-sensing device in a similar manner as was done for the temperature sensing device.

Alternatively, a highly sensitive neutron flux-sensing device can be obtained by using emitter capsule support means which produces a dominant thermal radiation loss term in the heat balance of the diode device, and using a fuel which undergoes exothermic reaction under neutron bombardment. In this instance, the thermal power density is determined from the maximum power point of the device's power output curve. Because the maximum power point is approximately proportional to the square of the power density, this device is a sensitive indicator of neutron flux level.

BRIEF DESCRIPTION OF THE DRAWINGS

My invention will be more fully understood, and other features and advantages thereof will become apparent, from the description given below of certain exemplary embodiments of the invention. This description of the exemplary embodiments is to be taken in conjunction with the accompanying drawings, in which:

FIG. 1 is an elevational view, shown partially broken away and partially in section, of an illustrative embodiment of a sensor constructed in accordance with this invention;

FIG. 2 is a fragmentary and enlarged view of a portion of the sensor as enclosed by the line 2—2 indicated in FIG. 1;

FIG. 3 is a fragmentary and enlarged view of another portion of the sensor as enclosed by the line 3—3 indicated in FIG. 1;

DESCRIPTION OF THE PRESENT EMBODIMENTS

Figure 4:
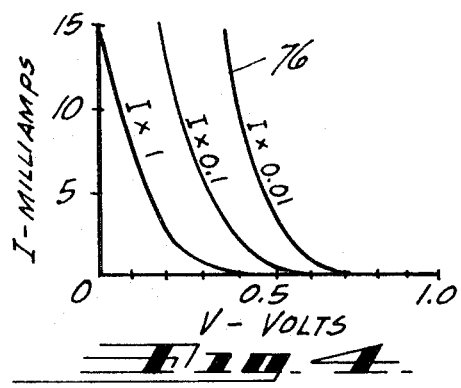
FIG. 4 is a graph showing a plot of the output curve (on different current scales) for a temperature-sensing device at a known collector temperature.

FIG. 1 is an elevational view of an illustrative embodiment of my invention, shown partially broken away and partially in section. Sensor 20 is representative of either a temperature-sensing device or a neutron flux-sensing device constructed according to this invention. This will be made apparent from the ensuing description of the sensor 20 first as a temperature-sensing device 20a and then with appropriate modifications (not requiring any drawing change) as a neutron flux-sensing device 20b. The sensor 20 is also generally similar in appearance and certain performance respects to the Thermionic Conversion Atomic Diode Battery of Ned S. Rasor, John G. DeSteese and Kenneth A. Gasper shown, described and claimed in the copending patent application which is fully cross-referenced above.

Temperature-sensing device 20a is generally symmetrical axially and includes an emitter capsule 22 suitably supported in and spaced from a collector housing 24. A right circular cylindrical radioisotope fuel pellet 26 is encapsulated by liner 28 which can be made of tantalum (Ta), tungsten (W), tantalum-10 percent tungsten, or other suitable encapsulating materials to form a fully encased primary capsule 30. The primary capsule 30 is, in turn, fully enveloped by a layer 32 which can be made of oxygenated tantalum (tantalum with less than 1 percent by weight of oxygen and produced in a process where oxygen goes into solid tantalum) to form a secondary capsule 34 having an external emitter surface 36. The liner 28 includes a casing 28a and a closing disc 28b welded thereto, and the layer 32 includes a container 32a and a cover disc 32b also welded thereto. The oxygenated tantalum surface 36 can be suitably cesiated subsequently at an appropriately low cesium vapor pressure for nominally vacuum mode (quasi-vacuum) diode operation. The emitter (fuel) capsule 22 thus contains a heat source which is preferably a suitably encapsulated radioisotope. The emitter capsule 22 has a diameter and height of 0.70 inch, for example.

The radioisotope fuel pellet 26 in the temperature-sensing device 20a can be fabricated from, for example, promethium-147 ($Pm^{147}$) with a half-life of 2.6 years or plutonium-238 ($Pu^{238}$) with a half-life of 87 years, providing a heat source (fuel capsule 22) having approximately a 1 watt/cm.³ average thermal power density and requiring no or little shielding for most applications. For a given output power (signal), a significantly smaller fuel capsule 22 having an average thermal power density of approximately 10 watts/cm.³ can be obtained using polonium-210 ($Po^{210}$) with a half-life of 0.4 year or curium-244 ($Cm^{244}$) with a half-life of 18 years, requiring minor or moderate shielding, respectively.

The collector housing 24 includes a body cylinder 24a and a lower disc 24b welded to the open lower end thereof to close the same. An upper corner flange ring 38 mounts an insulator ring 40 which, in turn, supports a cap disc 42. The cap disc 42 has a central dependent collar 44 and an upper cavity 46. The cavity 46 contains, for example, a cesium compound 48 of expanded pyrolytic graphite ($C_{10}Cs$) and is sealed with cover plate 50. A passageway 52 connects the cavity 46 to the space enclosed by the insulator ring 40 below the cap disc 42. The flange ring 38 is suitably welded to the cylinder 24a, and the insulator ring 40 is secured by suitable ceramic-to-metal braze material such as copper (Cu) to the flange ring 38 and the cap disc 42. The housing 24 can be made of oxygenated tantalum and subsequently cesiated internally, the flange ring 38, disc 42 and plate 50 can be made of niobium (Nb), and the insulator ring 40 can be made of aluminum oxide ($Al_2O_3$), for example.

The cover disc 32b of the layer 32 has an upper, central protruding stem 54 extending through and spaced from the sides of a central opening 56 in the body cylinder 24a of housing 24. The lower portion of a relatively thin walled tube 58 is press-fitted onto the stem 54, and the upper portion of the tube 58 is press-fitted into the dependent collar 44. Thus, the emitter capsule 22 is supported at its upper end by the tube 58. The opening 56 provides clearance and access for the tube 58 to the stem 54, and also permits entry of cesium vapor from the cesium compound 48 through the passageway 52 to the emitter external surface 36 and collector internal surface 60.

The collector housing 24 has a lower corner flange ring 62 welded thereto and which is similar to the upper flange ring 38. A lower insulator ring 64 is suitably secured (brazed) to the flange ring 62 and a cap disc 66 is, in turn, suitably secured to the lower insulator ring which is similar to the upper insulator ring 40. The cap disc 66 has a central dependent collar 68 into which is press-fitted the lower portion of a relatively thin walled tube 70 similar to the tube 58. The container 32a of the layer 32 has a lower, central protruding stem 72 around which the upper portion of the tube 70 is press-fitted. A lower central opening 74 in the lower disc 24b of the collector housing 24 provides clearance and access of the tube 70 to the stem 72. Thus, the emitter capsule 22 is supported at its lower end by the tube 70. The upper and lower tubes 58 and 70 support the emitter capsule 22 and maintain its external emitter surface 36 at the proper distance or spacing from the internal collector surface 60 of the housing 24. This spacing can be 0.005 inch, for example.

FIG. 2 is a fragmentary and enlarged view of the general region of the sensor 20 as enclosed by the line 2—2 indicated in FIG. 1. It can be seen that the lower portion of tube 58 is press-fitted onto the stem 54, and the upper portion of the tube is press-fitted into the collar 44. In the temperature-sensing device 20a, tube 58 has an outer diameter of 0.040 inch, a 0.003-inch thick wall, a length of 0.190 inch and is made of tantalum (Ta), for example. The tube 58 not only supports the upper end of the emitter capsule 22, but also serves as an electrical connection from the emitter surface 36 to the cap disc 42 and cover plate 50. The collector housing is, of course, directly connected to its internal collector surface 60.

FIG. 3 is a fragmentary and enlarged view of the general region of the sensor 20 as enclosed by the line 3—3 indicated in FIG. 1. It can be seen that the lower portion of tube 70 is press-fitted into the collar 68, and the upper portion of the tube is press-fitted onto the stem 72. In the temperature-sensing device 20a, tube 70 has an outer diameter of 0.040 inch, a 0.003-inch thick wall, a length of 0.190 inch and is made of tantalum, for example. The tube 70 not only supports the lower end of the emitter capsule 22, but also serves as an electrical connection from the emitter surface 36 to the cap disc 66. It is noted that the tubes 58 and 70 are fabricated in a suitable structure (of sufficient wall thickness, for example) and from appropriate material which emphasizes thermal coupling of the emitter to the collector in the temperature-sensing device 20a.

The temperature-sensing device 20a (sensor 20) is a low power level thermionic diode device such as the diode battery shown, described and claimed in the cross-referenced copending patent application previously noted. Performance of a low-power level thermionic diode device is based on a thermal balance of the device and the electrical characteristics of the electrode (emitter and collector) surfaces at their respective temperatures. The (generated) heat input is supplied by radioactive fuel in the emitter capsule and is lost by electron cooling, thermal radiation between the two electrode surfaces, and thermal conduction through the emitter supports and leads.

A suitable configuration of the low-power level thermionic diode device includes a cylindrical fuel capsule having an external emitter surface which is spaced from and completely enclosed by a housing having an internal collector surface. Then, the total heat generated $P_g$ in an emitter (fuel) capsule with diameter D and height h and average thermal power density $\rho$ is $$P_g = \rho \pi D^2 h/4 = P_r + P_c + P_e \qquad \text{[Eq. 1]}$$

where the thermal radiation loss $$P_r = \sigma \epsilon A (T_e^4 - T_c^4) \qquad \text{[Eq. 2]}$$

the thermal conduction loss $$P_c = G_c (T_e - T_c) \qquad \text{[Eq. 3]}$$

and the electron cooling loss $$P_e = I(eV + \phi_c' + 2kT_e) \qquad \text{[Eq. 4]}$$

$T_e$ and $T_c$ are the respective emitter and collector temperatures, $\sigma$ and $k$ are the Stefan-Boltzmann and Boltzmann constants, respectively, $\epsilon$ is the net thermal emissivity of the electrode region, $A$ is the emitter area, $G_c$ is the thermal conductance, I the diode output current, V the diode output voltage, $\phi_c'$ the effective collector work function, and $e$ the electronic charge. The effective collector work function $\phi_c'$ includes any space charge barrier as an addition to the collector work function $\phi_c$.

Generally, the electron cooling loss ($P_e$) is significant only at higher power levels (greater than 10 milliwatts) and is easily calculated from the diode output curves. The thermal radiation loss ($P_r$) is the dominant loss term in a well designed power source (diode battery). On the other hand, the thermal conduction loss ($T_c$) is the dominant loss term in a well-designed temperature-sensing device (20a). The steady state emitter temperature ($T_e$) is determined by the values of $T_c$, $G_c$, $\epsilon A$ and $\rho$. The interrelation of parameters which determine the diode electrical output is more complex and is not given here. For this, reference is again made to the cross-referenced copending patent application noted above.

The values of the different variables required for successful operation of these thermionic diode devices are readily obtainable. The low current densities are easily provided by conventional refractory metals immersed in a very low pressure cesium vapor (nominally vacuum mode operation). The electrode work function is lowered by adsorption of cesium on the electrode surface. Such emitters, for example, have work functions of 1.3 to 1.7 electron volts (ev.) and typically operate at temperatures of 375 to 1,000° C. For device operation within 100° C. of room temperature, very low work function (e.g., 1.0 ev.) photocell surfaces can be used as collectors. Alternately, the refractory metals may be used and thermal insulation applied between the collector and the environment. For higher ambient temperature operations, as in a nuclear reactor core, collectors similar to the emitters are used. Typical net thermal emissivities of 0.20 to 0.05 are obtained and interelectrode spacings of 0.008 to 0.0008 inch can be used. While satisfactory output power is obtained with thermal power densities as low as 0.3 watt/cm.³, power densities as high as 100 watts/cm.³ can be utilized.

The temperature-sensing device 20a is structurally similar to the diode battery utilizing a radioactive fuel and, therefore, need not be described in greater detail. The temperature-sensing device 20a differs mainly from the electric power source (diode battery) in its emitter capsule support structure. In the power device, the design goal is to maximize efficiency by reducing the thermal losses as much as possible. In practice, conduction losses can be made much less than radiation losses and electron-cooling losses are minor at the current densities for milliwatt level devices. The conduction losses are minimized by suitable emitter capsule support structure design, and this thermal decoupling of the collector from the emitter is highly desirable to allow power device performance to be independent of ambient (and therefore collector) temperature.

In contrast, thermal coupling of the collector to the emitter is emphasized in the temperature-sensing device 20a. When the thermal conduction loss term ($P_c$ in Equation 1) dominates in the heat balance, collector temperature is directly coupled to emitter temperature (Equation 3). While this major conduction term results in an inefficient power supply, it allows the determination of collector (ambient) temperature readily from the emitter temperature. The emitter temperature is accurately determined from the device's current versus voltage output curve by replotting it as the natural logarithm of current versus voltage. The slope of the linear portion of the new curve equals $-1/kT_e$ where $k$ is the Boltzmann constant and $T_e$ is the emitter temperature. In one system for the temperature-sensing device, a computer program was written (set up) to determine the emitter temperature from digitized output data.

Once the temperature difference between emitter and collector has been determined for a given device design, it is possible to determine collector temperatures. From analysis of the device's output curve, the emitter temperature is obtained. By subtracting the previously determined temperature difference from the emitter temperature, the collector temperature is obtained. Because the collector can be in direct thermal contact with the environment, this determination of collector temperature is in fact a determination of ambient temperature. In a "worst case" test situation, an older temperature-sensing device (which had a remote liquid cesium reservoir and not an integral cesium reservoir as the device 20a) having an emitter capsule support structure that produced thermal conduction losses on the same order as the thermal radiation losses was used with a written computer program to demonstrate an exaggerated error effect between collector and emitter temperature changes due to the lack of closer thermal coupling between emitter and collector. More complete thermal coupling would have produced an emitter temperature change equal to that of the collector in this temperature-sensing test device.

Figure 5:
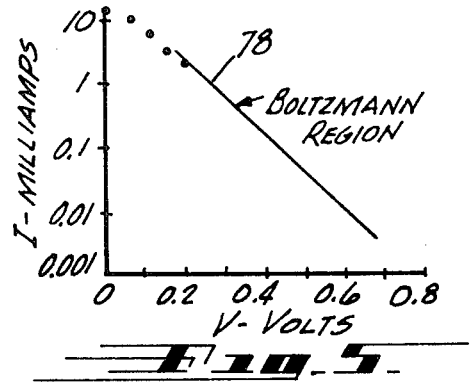
FIG. 5 is a graph showing the output curve of FIG. 4 replotted with current on a logarithmic scale.

FIGS. 4 and 5 are graphs showing the output curve of the test device plotted normally as output current versus output voltage and then replotted as the (natural) logarithm of output current versus output voltage. Curve 76 is plotted for three different current scales for greater accuracy in FIG. 4, and the linear Boltzmann region is indicated on curve 78 in FIG. 5.

Test conditions were such that cesium reservoir temperature $T_r=172°$ C., collector temperature $T_c=292°$ C. (no collector heat) and emitter temperature $T_e$ was estimated to be 571° C. (which is to be determined).

The curve 76 in FIG. 4 is given by the relationship $$I=Ce^{-V/kT} \quad \text{[Eq. 5]}$$

and the curve 78 in FIG. 5 by $$\ln I = \ln C - V/kT_e \quad \text{[Eq. 6]}$$

It is apparent that equation 6 is of the form $$y=a+bx \quad \text{[Eq. 7]}$$

where $$a=\ln C \quad \text{[Eq. 8]}$$

and $$b=-1/kT_e \quad \text{[Eq. 9]}$$

From FIG. 5, the slope b of the Boltzmann region of curve 78 is $$b=(y_2-y_1)/(x_2-x_1) \quad \text{[Eq. 10]}$$

or $$b=\frac{\ln I_2 - \ln I_1}{V_2-V_1}=\frac{\ln(I_2/I_1)}{V_2-V_1} \quad \text{[Eq. 11]}$$

Thus, selecting the following values from the Boltzmann region of curve 78, $I_2=0.62$, $V_2=0.3$, $I_1=0.01$ and $V_1=0.6$ and substituting in equation 11

$$b=\frac{\ln(0.62/0.01)}{0.3-0.6}=-13.757$$

From equation 9, $$T_e=-1/kb \quad \text{[Eq. 12]}$$

and $$T_e=1160606/13.757=843.6° \text{ K.}=570.6° \text{ C.}$$

Figure 6:
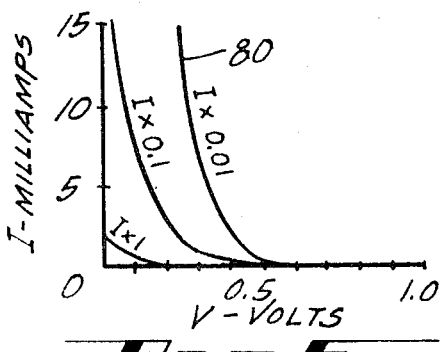
FIG. 6 is a graph showing a plot similar to that of FIG. 4 for the temperature-sensing device at another known collector temperature.
Figure 7:
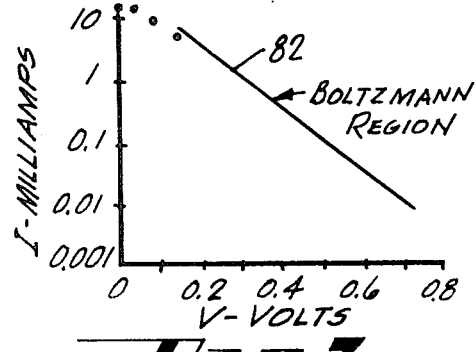
FIG. 7 is a graph showing the output curve of FIG. 6 replotted with current on a logarithmic scale.

FIGS. 6 and 7 are graphs corresponding to FIGS. 4 and 5, respectively, of which the curves 80 and 82 thereof were obtained from test device conditions wherein the cesium reservoir temperature $T_r=154°$ C. and collector temperature $T_c=285°$ C. This is a collector temperature change of $292-285=7°$ C. From FIG. 7, the Boltzmann region of curve 82 yielded values of $I_2=3.55$, $V_2=0.2$, $I_1=0.014$ and $V_1=0.6$. Utilizing Equations 11 and 12 for these values, $b=-13.84$ and $T_e=838.6°$ K. or 565.6° C. Thus, the emitter temperature change was $570.6-565.6=5°$ C. instead of 7° C. This error of 2° C. represents, of course, a "worse case" test situation and can be easily reduced to within a small fraction of a degree by increasing the thermal coupling between emitter and collector through the use of suitable emitter capsule supports. With suitable thermal coupling, ambient (collector) temperature differs from the emitter temperature by a substantially constant amount in this temperature-sensing device.

The temperature-sensing device 20a is compact, lightweight and long-lived. It possesses good resolution (less than 2° C.) over a range from below room temperature to above 1,000° C. It is not subject to radiation damage and any long term change in power density resulting from neutron interaction, for example, with its fuel is easily calculated. Such devices produce signals which can be readily detected (0–1 volt and 0.001–100 milliamps typically). For use in regions of extremely high electrical noise, these temperature-sensing devices can be made larger or connected in parallel and/or series for increased output.

One of the main uses of the temperature-sensing device 20a is in a nuclear reactor where the ambient temperature sensed will be greater than at least 300° C. and varying over a 100 to 200° C. span or range. Thus, the ambient temperature is always greater than initial normal collector temperature. However, where the device 20a is used to measure lower ambient temperatures such as room temperature, a suitable amount (thickness) of insulation must be provided on the device 20a to drop the temperature in the insulation from collector temperature to minimum room temperature at the insulation external surface. In this manner, when the room temperature increases, the collector temperature is correspondingly increased a proportionate amount as transmitted by the insulation. The device 20a is suitably calibrated in all instances to correlate ambient and collector temperatures with emitter temperature. Insulation 24c is fragmentarily indicated in FIG. 1. Of course, the device's output leads extend through the insulation 24c.

The sensor 20 of FIG. 1 can serve as a neutron flux-sensing device 20b by modifying the temperature-sensing device 20a such that it is fueled with a material which will undergo an exothermic reaction under neutron bombardment. Thus, the input heat is supplied by neutron induced reactions instead of radioisotope decay. Reactions that can be used are neutron, fission ($n$, fission), neutron, alpha ($n, \alpha$) and neutron, proton ($n, p$). Examples of the first two types are obtained by replacing the promethium-147 fuel pellet 26 with fully enriched uranium-235 (i.e., 93 percent $U^{235}$) or with boron-10 ($B^{10}$). With all of these reactions, the heat produced is directly proportional to the neutron flux present. Thus, the nominal neutron flux can be determined by determining the heat generated ($P_o$) within the emitter (fuel) capsule 22.

For an emitter capsule 22 of given dimensions, the average thermal power density $\rho$ is also determined with the determination of $P_o$ as can be seen from equation 1. This power density $\rho$ is directly proportional to emitter temperature $T_e$ in a thermal conduction dominated device for a given collector temperature, while in a thermal radiation dominated device it is proportional to $T_e^4$. Thus, the neutron flux can be determined by determining the emitter temperature $T_e$ in such instances. The power density $\rho$ can, therefore, be obtained from the device's current versus voltage output curve as before. It should be noted that the maximum power point is approximately proportional to the square of the power density in a thermal radiation dominated device. Accordingly, such a device with the suitable fuel material may be preferable to use for certain applications since the maximum power is a sensitive indicator of neutron flux level and small changes can be easily detected. With a resistance load, the power versus voltage output curve can be easily obtained by multiplying current by the corresponding voltage. The maximum power point is, however, approximately proportional to the square root of the power density in a conduction dominated device. In this instance, the maximum power point is less sensitive to the power density.

In a conduction dominated device 20b, the collector temperature $T_c$ is directly coupled to emitter temperature $T_e$ and the temperature difference $\Delta T = T_e - T_c$ is a constant when the flux is constant. If the ambient (collector) temperature increases, the emitter temperature also increases such that $\Delta T$ remains constant for constant flux. When the flux increases, however, the measurable temperature difference $\Delta T$ increases proportionately. Since the collector temperature is controlled by the environment (at ambient temperature in a nuclear reactor) which is substantially constant during normal operation, emitter temperature thus increases directly with flux. Where the ambient (collector) temperature is changing, as during reactor startup or shutdown, a temperature-sensing device 20a can be used to determine collector temperature of the flux-sensing device 20b (which provides a measure of its emitter temperature) so that the temperature difference $\Delta T$ and, hence, the proportionate flux can be determined.

In a device 20b having an emitter capsule 22 filled with fully enriched (93 percent) $U^{235}$, the power density $\rho$ is given by $$\rho = \Sigma_{nf} \phi / c \qquad \text{[Eq. 13]}$$

where $\rho$ is the power density, watts/cm.$^3$ $\Sigma_{nf}$ is the macroscopic fission cross section of the fuel (approximately 25 cm.$^{-1}$)

$\phi$ is the neutron flux, neutrons/cm.$^2$ sec.

$c$ is the conversion factor for fissions to energy (approximately $3.3 \cdot 10^{10}$ watt$^{-1}$ sec.$^{-1}$)

Thus, $$\rho = 7.5 \cdot 10^{-10} \phi \qquad \text{[Eq. 14]}$$

When the power density $\rho$ is determined to be equal to 0.75 watts/cm.$^3$, then from equation 14, the neutron flux $\phi$ is equal to $10^9$. Conversely, a neutron flux of this value will produce the noted power density value which is near that provided by promethium-147 fuel in a 1.6-milliwatt diode battery. Because power reactors run with typical fluxes of $10^{13}$ or greater, and research reactors with fluxes as high as $10^{15}$, devices with lower enrichment of uranium-235 or of smaller size can provide sufficiently large output signals which can be easily measured.

Using a fuel of boron-10 which undergoes a neutron, alpha reaction ($n + B^{10} \rightarrow Li^7 + \alpha$) in a thermal neutron field, the macroscopic reaction cross section $\Sigma_{n,\alpha}$ of the fuel is approximately 540 cm.$^{-1}$, and 2.30 million electron volts (mev.) is the energy shared by the lithium-7 ($Li^7$) and alpha particles per reaction (and therefore is the energy absorbed in the emitter fuel volume). By converting the mev. unit to watt-sec., it can be shown that the power density is $$\rho = 2 \cdot 10^{-10} \phi \qquad \text{[Eq. 15]}$$

When the power density $\rho$ is determined to be equal to 0.75 watts/cm.$^3$, then from equation 15, the neutron flux $\phi$ is equal to $3.8 \cdot 10^9$. Thus, conversely, this neutron flux can produce a power density in a boron-10 fuel to provide sufficiently large output signals which can be easily measured.

The neutron flux-sensing device 20b is compact, lightweight and long-lived. It is also self-powered and needs no high-voltage supply and can be operated from room temperature to over 1,000° C. The compactness of the device 20b enables its use almost anywhere in a reactor. Together with the use of reasonably low cross section structural materials, this ensures a minimum neutron flux depression. Neutron flux depression is a second order effect which is negligible with the device 20b and slightly lowers the average neutron density in the emitter (fuel) capsule. Fissionable or nonfissionable materials can be used in the emitter capsule 22 (e.g., $U^{235}$ or $B^{10}$, respectively). Further, by suitable choice of fissionable material, the device 20b can be used as a threshold fission detector. Thus, a neutron energy spectrum can be determined at a location by placing several of these detectors nearby, if the detectors contain respective fissionable materials having different fission threshold levels.

Figure 8:
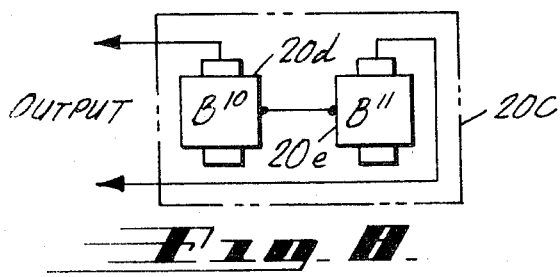
FIG. 8 is a block diagram of a neutron flux sensor which is compensated for gamma radiation.

FIG. 8 is a block diagram of a sensor 20c which compensates for any gamma ($\gamma$) contribution in the output of the neutron flux-sensing device 20b illustratively shown structurally in FIG. 1. The gamma contribution is relatively unimportant in a nuclear reactor, but will affect slightly the output of the neutron flux sensor. However, in order to remove the minor gamma contribution from the output of a neutron flux sensor, two sensing devices 20d and 20e are connected back-to-back in series (opposing polarities) to provide a compensating sensor 20c. The device 20d is the neutron flux-sensing device 20b fueled with boron-10 and the device 20e is similar thereto but is fueled with boron-11 ($B^{11}$), for example. The boron-10 reacts to both neutrons and gamma but the boron-11 reacts only to gamma. Thus, the output of the compensated device 20c is only that due to neutrons.

Figure 9:
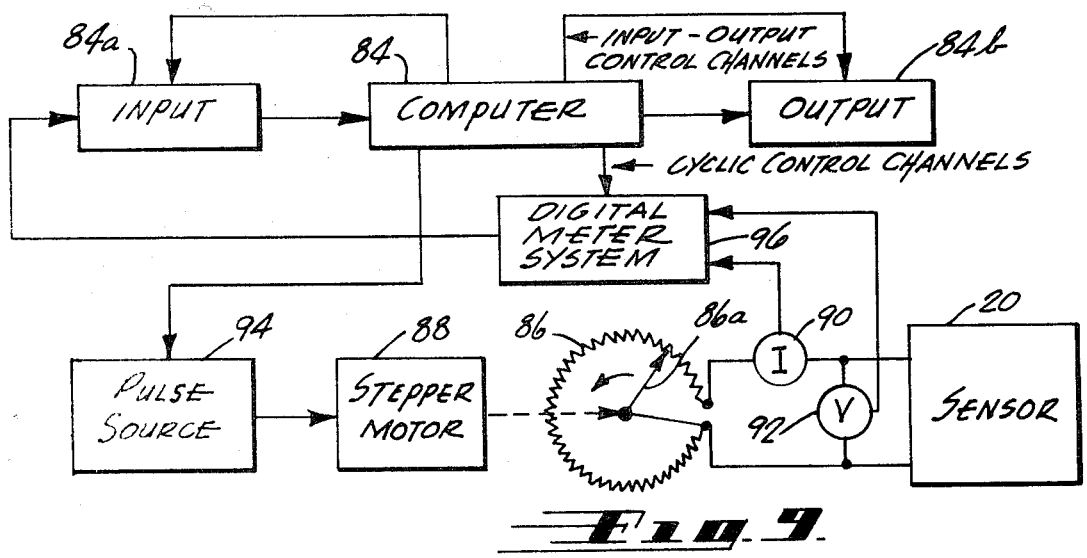
FIG. 9 is a block diagram of a system wherein the sensor is used with a computer and other related devices.

FIG. 9 is a block diagram of a system wherein sensor 20 is used in connection with a computer 84 and certain other associated devices. The sensor 20 can be either the temperature-sensing device 20a or the neutron flux sensing device 20b. Of course, the corresponding computer program written for each of these devices 20a and 20b must be appropriately used. The output of sensor 20 is connected to a circularly wound potentiometer 86 having its wiper 86a connected to one potentiometer end as shown and driven by a stepper motor 88. Current sensor 90 and voltage sensor 92 are suitably connected to the output of the sensor 20. The stepper motor 88 is energized by the output of pulse source 94 which is controlled by the computer 84.

The current sensor 90 can, for example, be a small, series-connected precision resistor (which is thus the minimum resistance load) and the voltage drop across it may feed a channel of a digital meter system 96 (e.g., a Honeywell Model 620 Digital Voltmeter System with a Model 35 Teletypewriter Paper Tape Output) wherein a digitally coded output signal is suitably provided on tape to the computer input device 84a (e.g., an IBM Model 1134 Tape Reader). Similarly, the voltage sensor 92 can, in this instance, be simply lead connections across the output of sensor 20 to feed its output voltage to another channel of the digital meter system 96 which provides a correspondingly coded output signal on tape to the computer input device 84a. Of course, both current and voltage signals are controlled, synchronized and analyzed by a suitably written program. The output of computer 84 is connected to output device 84b (e.g., an IBM Model 1132 Printer or IBM Model 1627 Plotter), and both input and output devices 84a and 84b are appropriately controlled by the computer 84 according to its program.

In operation, the proper program is set up in the computer 84. For a measuring cycle, the computer 84 turns the pulse source 94 on and off a predetermined number of times. The stepper motor 88 is energized by a series of spaced pulses and drives the wiper 86a in discrete steps around the potentiometer 86. The potentiometer 86 is connected as a rheostat and, thus, the resistance load of the sensor 20 is discretely increased over a cycle. Actually, only two points in the Boltzmann region is required to determine emitter temperature, and the operation is quite simple. After each step, current and voltage measurements are converted directly into the digitally coded electrical signals by the digital meter system 96 and are therein suitably provided i.e., recorded, punched or printed) on tape for use by the input device 84a of the computer 84. The input signals for each step are operated upon by the computer 84 which is programmed to solve the appropriate system equations i.e., plot and replot the sensor output curve and then compute the slope within the certain voltage limits which confines the determination within the Boltzmann region).

A power output curve is obtained where the program calls for the multiplication of current and voltage readings. The program can also provide for computer storage of the maximum power reading and subsequent readout thereof at the end of a cycle. The computer output is applied to the output device 84b which prints the resulting answers for each measuring cycle. Pulse source 94, input device 84a and output device 84b are, of course, controlled and synchronized properly by the corresponding sections of the computer program. The computer 84 (including input and output devices 84a and 84b) can be, for example, a Type 1130 General Purpose Computer with input device (paper) tape reader Model 1134 and output device printer Model 1132 or plotter Model 1627, all manufactured and sold by International Business Machines Corporation.

While certain dimensions and types of materials have been mentioned in the foregoing description, such dimensions and types of materials have been given by way of example only. It is to be understood that I do not desire to be limited in my invention to the exact details of construction shown and described, for obvious modifications will occur to persons skilled in the art.

I claim:
1. A sensor comprising:
an emitter structure including an emitter surface thereon;
fuel material for heating said emitter surface;
a collector structure including a collector surface thereon;
a housing adapted to enclose said emitter and collector structures and maintain a quasi-vacuum vacuum condition within said housing;
means for supporting and maintaining said emitter surface normally at a substantially predetermined spacing from said collector surface, said support means being constructed to produce a predetermined degree of thermal coupling of said emitter surface to said collector surface such that thermal conduction loss is dominant in a heat balance of said sensor and collector surface temperature is then directly coupled to emitter surface temperature; and
output means adapted to connect respectively with said emitter and collector surfaces, for providing an electrical output from said sensor whereby an output curve can be established therefrom.

2. The invention as defined in claim 1 wherein said fuel material includes a radioisotope fuel material, and said collector surface is substantially at ambient temperature whereby determination of emitter surface temperature from said output curve allows the determination of said ambient temperature therefrom.

3. The invention as defined in claim 2 including adjustable load means connected to said output, said load means being variable to provide different output signals corresponding to respective output curve readings of said sensor, and computing means for determining said emitter and collector surface temperatures from said readings whereby ambient temperature can be measured.

4. The invention as defined in claim 1 wherein said support means is constructed to provide a predetermined degree of thermal coupling of said emitter surface to said collector surface such that thermal radiation loss is dominant in a heat balance of said sensor, and said fuel material includes a material which undergoes exothermic reaction under neutron bombardment whereby said sensor can be used to measure nominal neutron flux level which is proportional to the emitter surface temperature or the maximum power point of said output curve.

5. The invention as defined in claim 4 including adjustable load means connected to said output, said load means being variable to provide different output signals corresponding to respective output curve readings of said sensor, and computing means for determining a selected one of both the emitter surface temperature and the maximum power point of said output curve from said readings whereby nominal neutron flux level is measured.

6. The invention as defined in claim 5 wherein said adjustable load means is variable in discrete steps to provide said different output signals corresponding to respective output curve readings of said sensor.

7. The invention as defined in claim 1 wherein said fuel material includes a material which undergoes exothermic reaction under neutron bombardment whereby said sensor can be used to measure nominal neutron flux level which is proportional to the emitter surface temperature or the maximum power point of said output curve.

8. The invention as defined in claim 7 including, in addition, another sensor similar to said sensor and connected in series in opposite polarity thereto, said fuel material of said similar sensor comprising a material which undergoes exothermic reaction essentially only to gamma radiation whereby any small gamma contribution is prevented from appearing in the measured neutron flux level.

9. The invention as defined in claim 7 including adjustable load means connected to said output, said load means being variable to provide different output signals corresponding to respective output curve readings of said sensor, and computing means for determining a selected one of both the emitter surface temperature and the maximum power point of said output curve from said readings whereby neutron flux level is measured.

10. The invention as defined in claim 9 wherein said adjustable load means is variable in discrete steps to provide said different output signals corresponding to respective output curve readings of said sensor.

11. A measuring system comprising:
a sensor including
an emitter capsule containing a fuel material therein, and having an external emitter surface thereon,
a collector housing having an internal collector surface therein, said housing being adapted to enclose said capsule and maintain a quasi-vacuum condition within said housing,
means for supporting said capsule in said housing and maintaining said emitter surface normally at a substantially predetermined spacing from said collector surface, said support means being constructed to produce a predetermined degree of thermal coupling of said emitter surface to said collector surface, and output means adapted to connect respectively with said emitter and collector surfaces, for providing an electrical output from said sensor;

adjustable load means connected to said output, said load means being variable to provide different output signals from said sensor; and means for converting said different output signals into respective output readings whereby an output curve can be established therefrom.

12. The invention as defined in claim 11 wherein said adjustable load means is variable in discrete steps to provide said different output signals corresponding to respective output curve readings of said sensor.

13. The invention as defined in claim 11 wherein said fuel material is a radioisotope, and said collector surface is substantially at ambient temperature whereby determination of emitter surface temperature from said output curve allows the determination of said ambient temperature therefrom.

14. The invention as defined in claim 13 including computing means for determining said emitter and collector surface temperatures from said readings whereby ambient temperature can be measured.

15. A measuring system comprising:

a sensor including an emitter structure having an emitter surface thereon, a fuel material for heating said emitter surface, a collector structure having a collector surface thereon, a housing adapted to enclose said emitter and collector structures and maintain a quasi-vacuum condition within said housing, means for supporting and maintaining said emitter surface normally at a substantially predetermined spacing from said collector surface, said support means being constructed to produce a predetermined degree of thermal coupling of said emitter surface to said collector surface, and output means adapted to connect respectively with said emitter and collector surfaces, for providing an electrical output from said sensor;

adjustable load means connected to said output, said load means being variable to provide different output signals from said sensor; and means for converting said different output signals into respective output readings whereby an output curve can be established therefrom.

* * * * *